United States Patent
Somlo et al.

[15] 3,681,403
[45] Aug. 1, 1972

[54] PROCESS FOR THE PRODUCTION OF 2,5-DIAMINO-3,6-DIHALOGENO-P-BENZOQUINONES

[72] Inventors: Tibor Somlo, Birsfelden; Ivan Orban, Basel, both of Switzerland

[73] Assignee: Ciba-Geigy A.G., Basel, Switzerland

[22] Filed: July 26, 1968

[21] Appl. No.: 747,842

[30] Foreign Application Priority Data

Aug. 25, 1967 Switzerland ............... 11983/67

[52] U.S. Cl. ............................. 260/396 R, 260/246
[51] Int. Cl. ............................................ C07c 97/08
[58] Field of Search ................................. 260/396 R

[56] References Cited

UNITED STATES PATENTS 3,037,015  5/1962  Rudy et al. .................... 260/396

Primary Examiner—Lorraine A. Weinberger
Assistant Examiner—L. Arnold Thaxton
Attorney—Wenderoth, Lind & Ponack

[57] ABSTRACT

2,5-diamino-3,6-dihalogeno-p-benzoquinones are produced in unexpectedly high yield rates and excellent purity from tetrahalogenated p-benzoquinones by reaction with ammonia in a reaction medium consisting of an aprotic dipolar organic solvent having a dielectric constant of at least 30 at 25°C.

8 Claims, No Drawings

PROCESS FOR THE PRODUCTION OF 2,5-DIAMINO-3,6-DIHALOGENO-P-BENZOQUINONES

DETAILED DISCLOSURE

This invention relates to a novel process for the production of 2,5-diamino-3,6-dihalogeno-p-benzoquinones, in which the halogen atoms are selected from chlorine and bromine.

It is known to produce 2,5-diamino-3,6-dichloro-p-benzoquinone by the reaction of gaseous ammonia with chloranil in boiling ethanol. In this process the aforesaid benzoquinone derivative is obtained in a yield ratio of about 75 percent; however, the final product is contaminated by reaction products of chloranil with the solvent [cf. L.F. Fieser et al in J.A.C.S. 57, 1847 (1935)].

It has now been found that a higher yield of purer 2,5-diamino-3,6-dihalogeno-p-benzoquinone of the formula

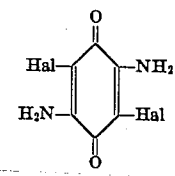

(I)

wherein Hal represents chlorine or bromine, is obtained by reacting a tetrahalogenated p-benzoquinone of the formula

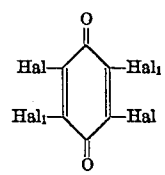

(II)

wherein Hal has the aforesaid meaning and $Hal_1$ represents identical or different halogens of an atomic number of at most 35, with ammonia, the reaction being performed in an aprotic dipolar organic solvent having a dielectric constant of at least 30 at 25° C as reaction medium.

Aprotic dipolar organic solvents suitable for use in the process of the invention are solvents which are incapable of releasing protons in the presence of ammonia and at the temperatures employed in the aforesaid reaction, and which are free from groups capable of forming stable compounds with a benzoquinone of formula I or with ammonia. Such solvents are defined by A.J. Parker in "The use of dipolar aprotic solvents" published in "Advances in Org. Chem.", Vol. 5, pages 3–4.

The dielectric constants of these solvents, designated hereinafter by $\epsilon$, are those given by A.J. Parker, loc. cit. and in the Tables of Landolt-Börnstein, Part 6 (1959).

Examples of suitable aprotic dipolar organic solvents as defined are dimethyl formamide ($\epsilon = 37.6$), dimethyl acetamide ($\epsilon = 37.8$), dimethyl sulphoxide ($\frac{1}{3} = 48.9$), tetramethylene sulphone (sulpholan) ($\epsilon = 45.5$), acetonitrile ($\epsilon = 37.5$), nitrobenzene ($\epsilon = 34.8$) and N-methyl-pyrrolidone ($\epsilon = 33.1$), as well as mixtures thereof.

2-Chloro-3,5,6-tribromo-, 2-bromo-3,5,6-trichloro-, 2,5-dichloro-3,6-difluoro-, 2,5-dibromo-3,6-difluoro-, 2,5-dibromo-3,6-dichloro-, or 2,6-dichloro-3,5-dibromo-p-benzoquinone, but preferably 2,3,5,6-tetrachloro- or 2,3,5,6-tetrabromo-p-benzoquinone are used as starting materials for the process according to the invention. Preferred compounds of formula I are those in which the two halogen atoms are identical.

The ammonia necessary for the reaction is advantageously introduced into the solution or suspension in gaseous form, or also in liquid form.

To perform the process according to the invention it is recommended to use 4 mols of ammonia per mol of tetrahalogenated p-benzoquinone. A slight excess of ammonia up to about 20 percent above the aforesaid 4 mols thereof (e.g. 0.8 mol) may also be used.

The reaction temperature should preferably not be lower than $-10°$ C since below that temperature cooling becomes technically much more difficult and the reaction rate decreases unduly. The upper limit for the reaction temperature is determined by the solubility of ammonia in the solvent, which should be at least about 5 g of $NH_3$ per liter. In practice this means a reaction temperature between $-10°$ and $+100°C$. Reaction temperatures between about 20 and 50°C are preferred.

The reaction time is between a few minutes to several hours depending on the starting material and the reaction temperature. Even at room temperature it is practically identical with the time required for introducing the necessary amount of ammonia. Ammonia is preferably introduced into the reaction mixture at a rate not higher than about 0.5 g per minute, so that cooling which is required because of the exothermic nature of the reaction, can be effected by simple technical means.

The process according to the invention can be performed on a large scale with inexpensive apparatus and in a simple manner, and affords very good yields. It is very surprising that replacement of the protic solvents, such as ethanol, used in the hitherto known processes, by an aprotic solvent as defined hereinbefore, in combination with the above defined reaction conditions, leads, under equal conditions, to an extraordinary increase in the reaction rate and affords final products of superior purity in substantially higher yields.

The 2,5-diamino-3,6-dihalogeno-1,4-benzoquinones which can be produced by the process of the invention are valuable intermediates for dyestuffs, particularly for the production of dioxazine dyestuffs.

Further details can be seen from the following examples which in no way limit the scope of the invention. The temperatures are given therein in degrees Centigrade. Percentages are given by weight.

EXAMPLE 1 - 2,5-diamino-3,6-dichloro-p-benzoquinone

One hundred g of chloranil are added to 240 g of acetonitrile ($\epsilon = 37.5$), whereupon 28 g of gaseous ammonia are introduced into the suspension within 2 hours at 35 to 40°. The mixture is stirred for another 2 hours while introducing a weak stream of gaseous ammonia (1 to 2 g/h), filtered and the filtered residue consisting of brown-violet crystals is washed with 60 g of acetonitrile and dried at 90° and 10 Torr. The dry final product consists of 82 g of 2,5-diamino-3,6-dichloro-p-benzoquinone (98 percent of the theoretical) and 40 g of ammonia chloride. This content of ammonium chloride has no detrimental effect in the further use of the final product as starting material for the production of dioxazine dyestuffs. It can also be removed from the final product by washing with water.

EXAMPLE 2 - 2,5-diamino-3,6-dibromo-p-benzoquinone

One hundred and six g of bromanil are added to 250 ml of nitrobenzene ($\epsilon = 34.8$) whereupon 20 g of gaseous ammonia are introduced into the resulting suspension within 1 hour while thoroughly stirring. The temperature of the reaction mixture rises from 20 to 45°. The resulting suspension is stirred for another hour at 50° while continuing introduction of a weak stream of gaseous ammonia. The brown, thick slurry formed is then filtered and the residue washed with 100 ml of methanol. The product is then slurried in 1 liter of water, filtered and the residue washed with 500 ml of water and dried. Yield: 73.5 g of 2,5-diamino-3,6-dibromo-p-benzoquinone (99 percent of the theoretical).

EXAMPLE 3 - 2,5-diamino-3,6-dichloro-p-benzoquinone

One hundred g of chloranil are added to 160 g of dimethyl sulphoxide ($\epsilon = 48.9$). 28 g of gaseous ammonia are then introduced at 25°, the whole is stirred for 2 hours and the thick suspension is poured into 500 ml of water. The aqueous suspension is then filtered and the crystals obtained are washed with water and dried. Yield: 77.4 g (91 percent of the theoretical).

EXAMPLE 4

By repeating Example 3, but replacing the dimethyl sulphoxide by 150 ml of dimethyl formamide ($\epsilon = 37.6$) and following otherwise the procedure given in the said example, 75 g of 2,5-diamino-3,6-dichloro-p-benzoquinone are obtained (90.6 percent of the theoretical).

EXAMPLE 5

By repeating Example 3 but replacing the dimethyl sulphoxide by 200 ml of N-methyl pyrrolidone ($\epsilon = 33.1$) and following otherwise the procedure given in the said example, 71 g of 2,5-diamino-3,6-dichloro-p-benzoquinone are obtained (86 percent of the theoretical).

EXAMPLE 6

By replacing the dimethyl sulphoxide in Example 3 by 150 ml of dimethyl acetamide ($\epsilon = 37.8$) and otherwise following the procedure given in Example 3, 73 g of 2,5-diamino-3,6-dichloro-p-benzoquinone are obtained (88 percent of the theoretical).

EXAMPLE 7

Example 3 is repeated, but 28 g of liquid instead of gaseous ammonia are added slowly, otherwise following the procedure given and taking care that the reaction mixture does not entirely solidify. 75 g of 2,5-diamino-3,6-dichloro-p-benzoquinone are obtained (90.6 percent of the theoretical).

EXAMPLE 8 - 2,5-diamino-3,6-dichloro-p-benzoquinone 87 g of 2,5-difluoro-3,6-dichloro-p-benzoquinone are added to 200 g of acetonitrile ($\epsilon = 37.5$). 28 g of gaseous ammonia are then introduced into the resulting suspension within 2 hours while maintaining the temperature of the suspension at 35 to 40°. The mixture is then stirred for another 2 hours while introducing a weak stream of gaseous ammonia (1 to 2 g/h) thereinto, whereupon the brown-violet crystals obtained are separated by filtration and washed first with 60 g of acetonitrile and then with 500 ml of water and finally dried. The dry final product contains 82 g of 2,5-diamino-3,6-dichloro-p-benzoquinone (98 percent of the theoretical).

Example 9 - 2,5-diamino-3-chloro-6-bromo-p-benzoquinone

Example 1 is repeated but instead of 100 g of chloranil, an equivalent amount of 2,6-dichloro-3,5-dibromo-p-benzoquinone is used and the product of the formula

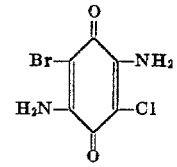

is obtained in high yield and purity.

We claim:

1. A process for the production of a 2,5-diamino-3,6-di-halogeno-p-benzoquinone of the formula

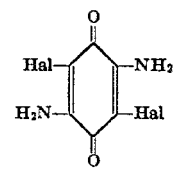

(I)

wherein Hal represents chlorine or bromine, comprising (a) reacting tetrahalogeno-p-benzoquinone of the formula

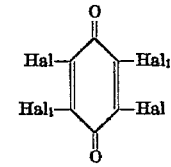

(II)

wherein Hal has the aforesaid meaning and Hal$_1$ represents fluorine, chlorine or bromine, with ammonia, in a molar ratio of at least 1:4 in an aprotic dipolar organic solvent free from groups capable of forming stable compounds with a benzoquinone of formula I or with ammonia and having dielectric constant of at least 30 at 25°C.

2. A process as defined in claim 1, wherein the molar ratio of said starting benzoquinone to ammonia is in the range of from 1:4 to about 1:4.8.

3. A process as defined in claim 2, wherein the temperature of the reaction mixture is at least −10°C and is such that the solubility of ammonia in said solvent is at least about 5 g per liter.

4. A process as defined in claim 1, wherein the temperature of the reaction mixture is held between −10°C and +100°C.

5. A process as defined in claim 1, wherein the temperature of the reaction mixture is held between about +20°C and +50°C.

6. A process as defined in claim 3, wherein ammonia is introduced at a rate of at most 0.5 g per minute into a mixture of said starting benzoquinone and said solvent.

7. A process as defined in claim 3, wherein the aprotic solvent is selected from dimethyl formamide, dimethyl acetamide, dimethyl sulphoxide, tetramethylene sulphone, acetonitrile, nitrobenzene, N-methylpyrrolidone and mixtures of these solvents with each other.

8. A process as defined in claim 1, wherein the two Hal in formulas I and II represent two chlorine or two bromine atoms.

* * * * *